(12) United States Patent
Simpson et al.

(10) Patent No.: US 12,003,354 B2
(45) Date of Patent: Jun. 4, 2024

(54) CLOCK DATA RECOVERY WITH DECISION FEEDBACK EQUALIZATION

(71) Applicant: Kandou Labs, S.A., Lausanne (CH)

(72) Inventors: Richard Simpson, Bedford (GB); Ali Hormati, Ecublens Vaud (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 18/330,187

(22) Filed: Jun. 6, 2023

(65) Prior Publication Data

US 2023/0318887 A1    Oct. 5, 2023

Related U.S. Application Data

(63) Continuation of application No. 17/517,042, filed on Nov. 2, 2021, now Pat. No. 11,671,288, which is a continuation of application No. 17/028,834, filed on Sep. 22, 2020, now Pat. No. 11,165,611, which is a continuation of application No. 16/261,502, filed on Jan. 29, 2019, now Pat. No. 10,785,072, which is a
(Continued)

(51) Int. Cl.
*H04L 25/03* (2006.01)
*H04L 7/00* (2006.01)
*H04L 7/033* (2006.01)

(52) U.S. Cl.
CPC ...... *H04L 25/03949* (2013.01); *H04L 7/0087* (2013.01); *H04L 7/033* (2013.01); *H04L 25/03057* (2013.01); *H04L 25/03885* (2013.01); *H04L 7/0025* (2013.01)

(58) Field of Classification Search
CPC . H04L 25/03949; H04L 7/033; H04L 7/0087; H04L 25/03057; H04L 7/0025
USPC ......................................................... 375/233
See application file for complete search history.

(56) References Cited

U.S. PATENT DOCUMENTS

| | | |
|---|---|---|
| 3,992,616 A | 11/1976 | Acker |
| 4,839,907 A | 6/1989 | Saneski |
| 5,266,907 A | 11/1993 | Dacus |

(Continued)

FOREIGN PATENT DOCUMENTS

| | | |
|---|---|---|
| CN | 203675093 U | 6/2014 |
| EP | 0740423 A2 | 10/1996 |

(Continued)

OTHER PUBLICATIONS

Chang, Hong-Yeh , et al., "A Low-Jitter Low-Phase-Noise 10-GHz Sub-Harmonically Injection-Locked PLL With Self-Aligned DLL in 65-nm CMOS Technology", IEEE Transactions on Microwave Theory and Techniques, vol. 62, No. 3, Mar. 2014, 543-555 (13 pages).

(Continued)

*Primary Examiner* — Fitwi Y Hailegiorgis

(57) ABSTRACT

Methods and systems are described for generating two comparator outputs by comparing a received signal to a first threshold and a second threshold according to a sampling clock, the first and second thresholds determined by an estimated amount of inter-symbol interference on a multi-wire bus, selecting one of the two comparator outputs as a data decision, the selection based on at least one prior data decision, and selecting one of the two comparator outputs as a phase-error decision, the phase error decision selected in response to identification of a predetermined data decision pattern.

20 Claims, 7 Drawing Sheets

Related U.S. Application Data continuation of application No. 15/582,545, filed on Apr. 28, 2017, now Pat. No. 10,193,716.

(60) Provisional application No. 62/328,716, filed on Apr. 28, 2016.

(56) References Cited

U.S. PATENT DOCUMENTS

| | | | |
|---|---|---|---|
| 5,302,920 A | 4/1994 | Bitting | |
| 5,528,198 A | 6/1996 | Baba et al. | |
| 5,565,817 A | 10/1996 | Lakshmikumar | |
| 5,602,884 A | 2/1997 | Wieczorkiewicz et al. | |
| 5,629,651 A | 5/1997 | Mizuno | |
| 5,802,356 A | 9/1998 | Gaskins et al. | |
| 6,002,717 A | 12/1999 | Gaudet | |
| 6,026,134 A | 2/2000 | Duffy et al. | |
| 6,037,812 A | 3/2000 | Gaudet | |
| 6,122,336 A | 9/2000 | Anderson | |
| 6,307,906 B1 | 10/2001 | Tanji et al. | |
| 6,316,987 B1 | 11/2001 | Dally et al. | |
| 6,380,783 B1 | 4/2002 | Chao et al. | |
| 6,389,091 B1 | 5/2002 | Yamaguchi et al. | |
| 6,426,660 B1 | 7/2002 | Ho et al. | |
| 6,507,544 B1 | 1/2003 | Ma et al. | |
| 6,509,773 B2 | 1/2003 | Buchwald et al. | |
| 6,633,621 B1 | 10/2003 | Bishop et al. | |
| 6,650,699 B1 | 11/2003 | Tierno | |
| 6,717,478 B1 | 4/2004 | Kim et al. | |
| 6,838,951 B1 | 1/2005 | Nieri et al. | |
| 6,917,762 B2 | 7/2005 | Kim | |
| 7,078,978 B2 | 7/2006 | Wakii | |
| 7,102,449 B1 | 9/2006 | Mohan | |
| 7,158,441 B2 | 1/2007 | Okamura | |
| 7,199,728 B2 | 4/2007 | Dally et al. | |
| 7,336,112 B1 | 2/2008 | Sha et al. | |
| 7,339,990 B2 | 3/2008 | Hidaka | |
| 7,532,697 B1 | 5/2009 | Sidiropoulos et al. | |
| 7,535,957 B2 | 5/2009 | Ozawa et al. | |
| 7,616,075 B2 | 11/2009 | Kushiyama | |
| 7,650,525 B1 | 1/2010 | Chang et al. | |
| 7,688,929 B2 | 3/2010 | Co | |
| 7,697,647 B1 | 4/2010 | McShea | |
| 7,822,113 B2 | 10/2010 | Tonietto et al. | |
| 7,839,229 B2 | 11/2010 | Nakamura et al. | |
| 7,852,109 B1 | 12/2010 | Chan et al. | |
| 7,860,190 B2 | 12/2010 | Feller | |
| 7,869,497 B2 | 1/2011 | Benvenuto et al. | |
| 7,873,115 B2 | 1/2011 | Zerbe et al. | |
| 8,036,300 B2 | 10/2011 | Evans et al. | |
| 8,253,454 B2 | 8/2012 | Lin | |
| 8,407,511 B2 | 3/2013 | Mobin et al. | |
| 8,472,513 B2 | 6/2013 | Malipatil et al. | |
| 8,583,072 B1 | 11/2013 | Ciubotaru et al. | |
| 8,649,476 B2 | 2/2014 | Malipatil et al. | |
| 8,791,735 B1 | 7/2014 | Shibasaki | |
| 8,861,583 B2 | 10/2014 | Liu | |
| 8,929,496 B2 | 1/2015 | Lee et al. | |
| 8,934,594 B1 | 1/2015 | Malhotra | |
| 9,036,764 B1 | 5/2015 | Hossain et al. | |
| 9,059,816 B1 | 6/2015 | Simpson et al. | |
| 9,083,576 B1 | 7/2015 | Hormati | |
| 9,100,232 B1 | 8/2015 | Hormati et al. | |
| 9,106,462 B1 | 8/2015 | Aziz et al. | |
| 9,306,621 B2 | 4/2016 | Zhang et al. | |
| 9,374,250 B1 | 6/2016 | Musah et al. | |
| 9,397,868 B1 | 7/2016 | Hossain et al. | |
| 9,438,409 B1 | 9/2016 | Liao et al. | |
| 9,520,883 B2 | 12/2016 | Shibasaki | |
| 9,565,036 B2 | 2/2017 | Zerbe et al. | |
| 9,571,309 B1 * | 2/2017 | Sakai | H04L 25/03057 |
| 9,577,815 B1 | 2/2017 | Simpson et al. | |
| 9,602,111 B1 | 3/2017 | Shen et al. | |
| 9,705,708 B1 | 7/2017 | Jin et al. | |
| 9,906,358 B1 | 2/2018 | Tajalli | |
| 9,960,902 B1 | 5/2018 | Lin et al. | |
| 10,055,372 B2 | 8/2018 | Shokrollahi | |
| 10,326,435 B2 | 6/2019 | Arp et al. | |
| 10,326,623 B1 | 6/2019 | Tajalli | |
| 10,574,487 B1 | 2/2020 | Hormati | |
| 10,848,351 B2 | 11/2020 | Hormati | |
| 11,070,349 B1 | 7/2021 | Joo | |
| 11,165,611 B2 | 11/2021 | Hormati et al. | |
| 2003/0001557 A1 | 1/2003 | Pisipaty | |
| 2003/0146783 A1 | 8/2003 | Bandy et al. | |
| 2003/0212930 A1 | 11/2003 | Aung et al. | |
| 2003/0214977 A1 | 11/2003 | Kuo | |
| 2004/0092240 A1 | 5/2004 | Hayashi | |
| 2004/0141567 A1 | 7/2004 | Yang et al. | |
| 2005/0024117 A1 | 2/2005 | Kubo et al. | |
| 2005/0078712 A1 | 4/2005 | Voutilainen | |
| 2005/0084050 A1 | 4/2005 | Cheung et al. | |
| 2005/0117404 A1 | 6/2005 | Savoj | |
| 2005/0128018 A1 | 6/2005 | Meltzer | |
| 2005/0141662 A1 | 6/2005 | Sano et al. | |
| 2005/0201491 A1 | 9/2005 | Wei | |
| 2005/0220182 A1 | 10/2005 | Kuwata | |
| 2005/0275470 A1 | 12/2005 | Choi | |
| 2006/0008041 A1 | 1/2006 | Kim et al. | |
| 2006/0062058 A1 | 3/2006 | Lin | |
| 2006/0140324 A1 | 6/2006 | Casper et al. | |
| 2006/0232461 A1 | 10/2006 | Felder | |
| 2006/0233291 A1 | 10/2006 | Garlepp et al. | |
| 2006/0256892 A1 | 11/2006 | Momtaz | |
| 2007/0001713 A1 | 1/2007 | Lin | |
| 2007/0001723 A1 | 1/2007 | Lin | |
| 2007/0047689 A1 | 3/2007 | Menolfi et al. | |
| 2007/0058768 A1 | 3/2007 | Werner | |
| 2007/0086267 A1 | 4/2007 | Kwak | |
| 2007/0127612 A1 | 6/2007 | Lee et al. | |
| 2007/0146088 A1 | 6/2007 | Arai et al. | |
| 2007/0147559 A1 | 6/2007 | Lapointe | |
| 2007/0183552 A1 | 8/2007 | Sanders et al. | |
| 2007/0201597 A1 | 8/2007 | He et al. | |
| 2007/0253475 A1 | 11/2007 | Palmer | |
| 2008/0007367 A1 | 1/2008 | Kim | |
| 2008/0069198 A1 | 3/2008 | Bhoja et al. | |
| 2008/0111634 A1 | 5/2008 | Min | |
| 2008/0136479 A1 | 6/2008 | You et al. | |
| 2008/0165841 A1 | 7/2008 | Wall et al. | |
| 2008/0181289 A1 | 7/2008 | Moll | |
| 2008/0219399 A1 | 9/2008 | Nary | |
| 2008/0317188 A1 | 12/2008 | Staszewski et al. | |
| 2009/0103675 A1 | 4/2009 | Yousefi et al. | |
| 2009/0167389 A1 | 7/2009 | Reis | |
| 2009/0195281 A1 | 8/2009 | Tamura et al. | |
| 2009/0224860 A1 | 9/2009 | Fagg | |
| 2009/0231006 A1 | 9/2009 | Jang et al. | |
| 2009/0243679 A1 | 10/2009 | Smith et al. | |
| 2009/0262876 A1 | 10/2009 | Arima et al. | |
| 2009/0262877 A1 | 10/2009 | Shi et al. | |
| 2010/0020862 A1 | 1/2010 | Peng | |
| 2010/0033259 A1 | 2/2010 | Miyashita | |
| 2010/0090723 A1 | 4/2010 | Nedovic et al. | |
| 2010/0090735 A1 | 4/2010 | Cho | |
| 2010/0156543 A1 | 6/2010 | Dubey | |
| 2010/0180143 A1 | 7/2010 | Ware et al. | |
| 2010/0220828 A1 | 9/2010 | Fuller et al. | |
| 2011/0002181 A1 | 1/2011 | Wang et al. | |
| 2011/0025392 A1 | 2/2011 | Wu et al. | |
| 2011/0148498 A1 | 6/2011 | Mosalikanti et al. | |
| 2011/0234278 A1 | 9/2011 | Seo | |
| 2011/0286497 A1 | 11/2011 | Nervig | |
| 2011/0286511 A1 | 11/2011 | Zeng et al. | |
| 2011/0311008 A1 | 12/2011 | Slezak et al. | |
| 2012/0051480 A1 | 3/2012 | Usugi et al. | |
| 2012/0082203 A1 | 4/2012 | Zerbe et al. | |
| 2012/0170621 A1 | 7/2012 | Tracy et al. | |
| 2012/0200364 A1 | 8/2012 | Iizuka et al. | |
| 2012/0206177 A1 | 8/2012 | Colinet et al. | |
| 2012/0213267 A1 | 8/2012 | Stojanovic et al. | |
| 2012/0224621 A1 | 9/2012 | Stojanovic et al. | |
| 2012/0235717 A1 | 9/2012 | Hirai et al. | |
| 2012/0327993 A1 | 12/2012 | Palmer | |
| 2013/0088274 A1 | 4/2013 | Gu | |

(56) References Cited

U.S. PATENT DOCUMENTS

| | | |
|---|---|---|
| 2013/0091392 A1 | 4/2013 | Valliappan et al. |
| 2013/0093471 A1 | 4/2013 | Cho et al. |
| 2013/0107997 A1 | 5/2013 | Chen |
| 2013/0108001 A1 | 5/2013 | Chang et al. |
| 2013/0202065 A1 | 8/2013 | Chmelar |
| 2013/0207706 A1 | 8/2013 | Yanagisawa |
| 2013/0243127 A1 | 9/2013 | Ito et al. |
| 2013/0271194 A1 | 10/2013 | Madoglio et al. |
| 2013/0285720 A1 | 10/2013 | Jibry |
| 2013/0287088 A1 | 10/2013 | Mobin et al. |
| 2013/0314142 A1 | 11/2013 | Tamura et al. |
| 2013/0322512 A1 | 12/2013 | Francese et al. |
| 2014/0169426 A1 | 6/2014 | Aziz et al. |
| 2014/0177699 A1 | 6/2014 | Tan et al. |
| 2014/0286381 A1 | 9/2014 | Shibasaki |
| 2014/0286457 A1 | 9/2014 | Chaivipas |
| 2015/0043627 A1 | 2/2015 | Kang et al. |
| 2015/0078495 A1 | 3/2015 | Hossain et al. |
| 2015/0117579 A1 | 4/2015 | Shibasaki |
| 2015/0180642 A1 | 6/2015 | Hsieh et al. |
| 2015/0220472 A1 | 8/2015 | Sengoku |
| 2015/0256326 A1 | 9/2015 | Simpson et al. |
| 2015/0319015 A1 | 11/2015 | Malhotra |
| 2016/0056980 A1 | 2/2016 | Wang et al. |
| 2016/0087610 A1 | 3/2016 | Hata |
| 2016/0134267 A1 | 5/2016 | Adachi |
| 2016/0261435 A1 | 9/2016 | Musah et al. |
| 2017/0005785 A1 | 1/2017 | Aleksic et al. |
| 2017/0005841 A1* | 1/2017 | Komori ............... H04L 1/0643 |
| 2017/0019276 A1 | 1/2017 | Francese |
| 2017/0228215 A1 | 8/2017 | Chatwin et al. |
| 2017/0310456 A1 | 10/2017 | Tajalli |
| 2017/0373889 A1 | 12/2017 | Sakai |
| 2018/0083763 A1 | 3/2018 | Black et al. |
| 2018/0219539 A1 | 8/2018 | Arp et al. |
| 2018/0227114 A1 | 8/2018 | Rahman et al. |
| 2018/0343011 A1 | 11/2018 | Tajalli et al. |
| 2018/0351769 A1 | 12/2018 | Tajalli et al. |
| 2018/0375693 A1 | 12/2018 | Zhou et al. |
| 2019/0109735 A1 | 4/2019 | Norimatsu |
| 2019/0199557 A1 | 6/2019 | Taylor et al. |
| 2019/0377378 A1 | 12/2019 | Gharibdoust |
| 2020/0162233 A1 | 5/2020 | Lee et al. |
| 2021/0248103 A1 | 8/2021 | Khashaba et al. |

FOREIGN PATENT DOCUMENTS

| | | |
|---|---|---|
| JP | 3615692 B2 | 11/2004 |
| KR | 0340178 B1 | 6/2002 |

OTHER PUBLICATIONS

Cui, Delong, et al., "A Dual-Channel 23-Gbps CMOS Transmitter/Receiver Chipset for 40-Gbps RZ-DQPSK and CS-RZ-DQPSK Optical Transmission", IEEE Journal of Solid-State Circuits, vol. 47, No. 12, Dec. 2012, 3249-3260 (12 pages).

Ha, J.C., et al., "Unified All-Digital Duty-Cycle and phase correction circuit for QDR I/O interface", Electronic Letters, The Institution of Engineering and Technology, vol. 44, No. 22, Oct. 23, 2008, 1300-1301 (2 pages).

Hidaka, Yasuo, et al., "A 4-Channel 1.25-10.3 Gb/s Backplane Transceiver Macro With 35 dB Equalizer and Sign-Based Zero-Forcing Adaptive Control", IEEE Journal of Solid-State Circuits, vol. 44, No. 12, Dec. 2009, 3547-3559 (13 pages).

Holden, Brian, "An exploration of the technical feasibility of the major technology options for 400GE backplanes", IEEE 802.3 400GE Study Group, Geneva, CH, Jul. 16, 2013, 1-18 (18 pages).

Inti, Rajesh, et al., "A 0.5-to-2.5 Gb/s Reference-Less Half-Rate Digital CDR with Unlimited Frequency Acquisition Range and Improved Input Duty-Cycle Error Tolerance", IEEE Journal of Solid-State Circuits, vol. 46, No. 12, Dec. 2011, 3150-3162 (13 pages).

Loh, Mattew, et al., "A 3×9 Gb/s Shared, All-Digital CDR for High-Speed, High-Density I/O", IEEE Journal of Solid-State Circuits, vol. 47, No. 3, Mar. 2012, 641-651 (11 pages).

Nandwana, Romesh Kumar, et al., "A Calibration-Free Fractional-N Ring PLL Using Hybrid Phase/Current-Mode Phase Interpolation Method", IEEE Journal of Solid-State Circuits, vol. 50, No. 4, Apr. 2015, 882-895 (14 pages).

Navid, Reza, et al., "A 40 Gb/s Serial Link Transceiver in 28 nm CMOS Technology", IEEE Journal of Solid-State Circuits, vol. 50, No. 4, Apr. 2015, 814-827 (14 pages).

Ng, Herman Jalli, et al., "Low Phase Noise 77-GHz Fractional-N PLL with DLL-based Reference Frequency Multiplier for FMCW Radars", European Microwave Integrated Circuits Conference, Oct. 10-11, 2011, 196-199 (4 pages).

Pozzoni, Massimo, et al., "A Multi-Standard 1.5 to 10 Gb/s Latch-Based 3-Tap DFE Receiver with a SSC Tolerant CDR for Serial Backplane Communication", IEEE Journal of Solid-State Circuits, vol. 44, No. 4, Apr. 2009, 1306-1315 (10 pages).

Rau, M, et al., "Clock/Data Recovery PLL Using Half-Frequency Clock", Phase-Locking in High-Performance Systems: From Devices to Architectures, 2003, 643-646 (4 pages).

Riley, M. W., et al., "Cell Broadband Engine Processor: Design and Implementation", IBM Journal of Research and Development, vol. 51, No. 5, Sep. 2007, 545-557 (13 pages).

Ryu, Kyungho, et al., "Process-Variation-Calibrated Multiphase Delay Locked Loop With a Loop-Enbedded Duty Cycle Corrector", IEEE Transactions on Circuits and Systems, vol. 61, No. 1, Jan. 2014, 1-5 (5 pages).

Shibasaki, Takayuki, et al., "A 56-Gb/s Receiver Front-End with a CTLE and 1-Tap DFE in 20-nm CMOS", IEEE 2014 Symposium on VLSI Circuits Digest of Technical Papers, 2014, (2 pages).

Shu, Guanghua, et al., "A 4-to-10.5 Gb/s Continuous-Rate Digital Clock and Data Recovery With Automatic Frequency Acquisition", IEEE Journal of Solid-State Circuits, vol. 51, No. 2, Feb. 2016, 428-439 (12 pages).

Tajalli, Armin, "Wideband PLL Using Matrix Phase Comparator", Journal of Latex Class Files, vol. 14, No. 8, Aug. 2016, 1-8 (8 pages).

Tan, Han-Yuan, "Design of Noise-Robust Clock and Data Recovery Using an Adaptive-Bandwidth Mixed PLL/DLL", Harvard University Thesis, Nov. 2006, 1-169 (169 pages).

Wang, Yi-Ming, et al., "Range Unlimited Delay-Interleaving and -Recycling Clock Skew Compensation and Duty-Cycle Correction Circuit", IEEE Transactions on Very Large Scale Integration (VLSI) Systems, vol. 23, No. 5, May 2015, 856-868 (13 pages).

Won, Hyosup, et al., "A 28-Gb/s Receiver With Self-contained Adaptive Equalization and Sampling Point Control Using Stochastic Sigma-Tracking Eye-Opening Monitor", IEEE Transactions on Circuits and Systems-I: Regular Papers, vol. 64, No. 3, Mar. 2017, 664-674 (11 pages).

Yoo, Danny, et al., "A 36-Gb/s Adaptive Baud-Rate CDR with CTLE and 1-Tap DFE in 28-nm CMOS", IEEE Solid-State Circuits Letters, vol. 2, No. 11, Nov. 2019, 252-255 (4 pages).

Zaki, Ahmed M., "Adaptive Clock and Data Recovery for Asymmetric Triangular Frequency Modulation Profile", IEEE Pacific Rim Conference on Communications, Computers and Signal Processing (PACRIM), Aug. 21, 2019, 1-6 (6 pages).

\* cited by examiner

CLOCK DATA RECOVERY WITH DECISION FEEDBACK EQUALIZATION

CROSS REFERENCE TO RELATED APPLICATIONS

This application is a continuation of U.S. application Ser. No. 17/517,042, filed Nov. 2, 2021, entitled "Clock Data Recovery with Decision Feedback Equalization", which is a continuation of U.S. application Ser. No. 17/028,834, filed Sep. 22, 2020, now U.S. Pat. No. 11,165,611, granted Nov. 2, 2021, entitled "Clock Data Recovery with Decision Feedback Equalization", which is a continuation of U.S. application Ser. No. 16/261,502, filed Jan. 29, 2019, now U.S. Pat. No. 10,785,072, granted Sep. 22, 2002, entitled "Clock Data Recovery with Decision Feedback Equalization", which is a continuation of U.S. application Ser. No. 15/582,545, filed Apr. 28, 2017, now U.S. Pat. No. 10,193,716, granted Jan. 29, 0219, entitled "Clock Data Recovery with Decision Feedback Equalization", which claims the benefit of U.S. Provisional Application No. 62/328,716, filed Apr. 28, 2016, entitled "Clock Data Recovery Utilizing Decision Feedback Compensation", all of which are hereby incorporated by reference in their entirety for all purposes.

REFERENCES

The following prior applications are herein incorporated by reference in their entirety for all purposes:

U.S. Pat. No. 9,100,232, filed Feb. 2, 2015 as application Ser. No. 14/612,241 and issued Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi].

U.S. patent application Ser. No. 14/926,958, filed Oct. 29, 2015, naming Richard Simpson, Andrew Stewart, and Ali Hormati, entitled "Clock Data Alignment System for Vector Signaling Code Communications Link", hereinafter identified as [Simpson].

The following additional references to prior art have been cited in this application:

"A 3×9 Gb/s Shared, All-Digital CDR for High-Speed, High-Density I/O", Matthew Loh, Azita Emami-Neyestanak, IEEE Journal of Solid-State Circuits, Vo. 47, No. 3, March 2012, hereinafter identified as [Loh].

BACKGROUND

It is common for communications receivers to extract a receive clock signal from the received data stream. Some communications protocols facilitate such Clock Data Recovery or CDR operation by constraining the communications signaling so as to distinguish between clock-related and data-related signal components. Similarly, some communications receivers process the received signals beyond the minimum necessary to detect data, so as to provide the additional information to facilitate clock recovery. As one example, a so-called double-baud-rate receive sampler may measure received signal levels at twice the expected data reception rate, to allow independent detection of the received signal level corresponding to the data component, and the chronologically offset received signal transition related to the signal clock component.

However, the introduction of extraneous communications protocol transitions is known to limit achievable data communication rate. Similarly, receive sampling at higher than transmitted data rate is known to substantially increase receiver power utilization.

Data-dependent receive equalization is also well known in the art. Generally, these time-domain-oriented equalization methods focus on compensating for the effects of inter-symbol-interference or ISI on the received signal. Such ISI is caused by the residual electrical effects of a previously transmitted signal persisting in the communications transmission medium, so as to affect the amplitude or timing of the current symbol interval. As one example, a transmission line medium having one or more impedance anomalies may introduce signal reflections. Thus, a transmitted signal will propagate over the medium and be partially reflected by one or more such anomalies, with such reflections appearing at the receiver at a later time in superposition with signals propagating directly.

One method of data-dependent receive equalization is Decision Feedback Equalization or DFE. Here, the time-domain oriented equalization is performed by maintaining a history of previously-received data values at the receiver, which are processed by a transmission line model to predict the expected influence that each of the historical data values would have on the present receive signal. Such a transmission line model may be precalculated, derived by measurement, or generated heuristically, and may encompass the effects of one or more than one previous data interval. The predicted influence of these one or more previous data intervals is collectively called the DFE compensation. At low to moderate data rates, the DFE compensation may be calculated in time to be applied before the next data sample is detected, as example by being explicitly subtracted from the received data signal prior to receive sampling, or implicitly subtracted by modifying the reference level to which the received data signal is compared in the receive data sampler or comparator. However, at higher data rates the detection of previous data bits and computation of the DFE compensation may not be complete in time for the next data sample, requiring use of so-called "unrolled" DFE computations performed on speculative or potential data values rather than known previous data values. As one example, an unrolled DFE stage may predict two different compensation values depending on whether the determining data bit will resolve to a one or a zero, with the receive detector performing sampling or slicing operations based on each of those predictions, the multiple results being maintained until the DFE decision is resolved.

BRIEF DESCRIPTION

Methods and systems are described for generating two comparator outputs by comparing a received signal to a first threshold and a second threshold according to a sampling clock, the first and second thresholds determined by an estimated amount of inter-symbol interference on a multi-wire bus, selecting one of the two comparator outputs as a data decision, the selection based on at least one prior data decision, and selecting one of the two comparator outputs as a phase-error decision, the phase error decision selected in response to identification of a predetermined data decision pattern.

DETAILED DESCRIPTION

Figure 1:
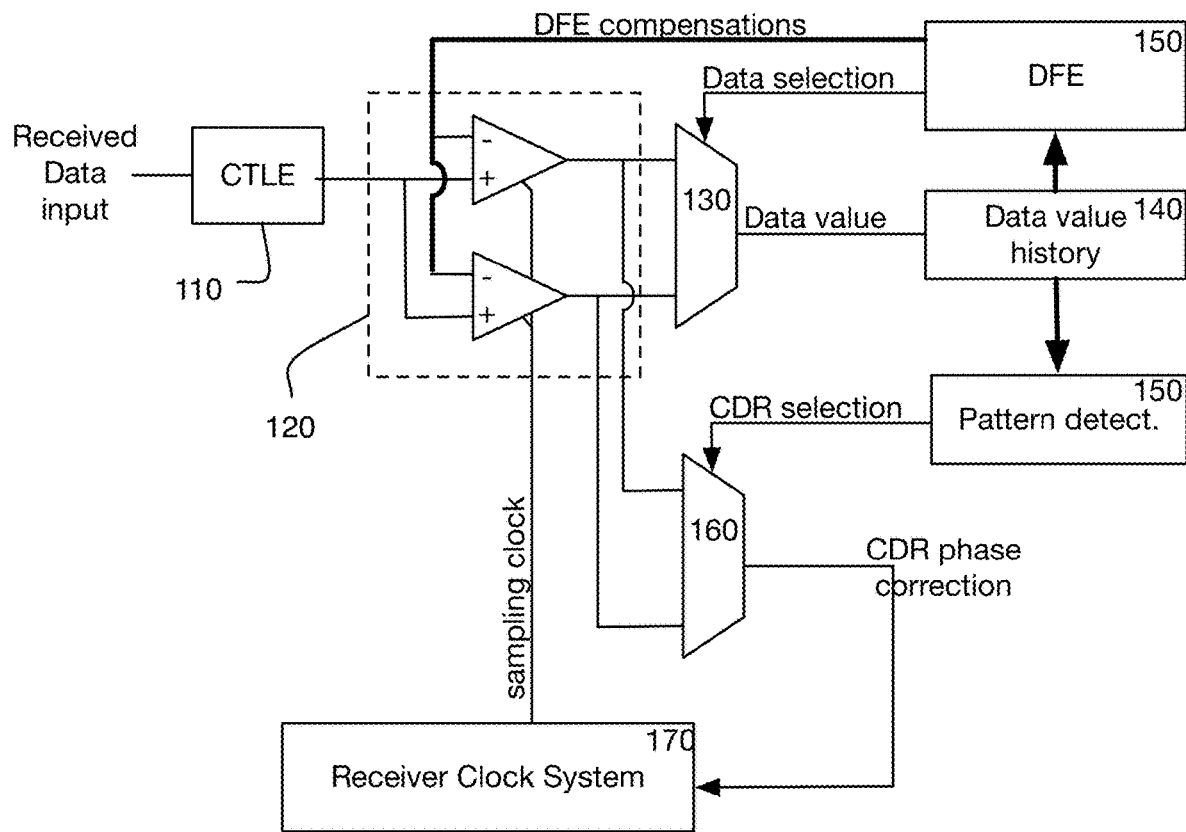
FIG. 1 is a block diagram of a receiver, in accordance with some embodiments.

In recent years, the signaling rate of high speed communications systems have reached speeds of tens of gigabits per second, with individual data unit intervals measured in picoseconds. One example of such a system is given by [Shokrollahi].

Conventional practice for a high-speed integrated circuit receiver have each data line to terminate (after any relevant front end processing such as amplification and frequency equalization) in a sampling device. This sampling device performs a measurement constrained in both time and amplitude dimensions; in one example embodiment, it may be composed of a sample-and-hold circuit that constrains the time interval being measured, followed by a threshold detector or digital comparator that determines whether the signal within that interval falls above or below (or in some embodiments, within bounds set by) a reference value. Alternatively, a digital comparator may determine the signal amplitude followed by a clocked digital flip-flop capturing the result at a selected time. In other embodiments, a combined time- and amplitude-sampling circuit is used, sampling the amplitude state of its input in response to a clock transition.

Subsequently, this document will use the term sampling device, or more simply "sampler" to describe this receiver component that generates the input measurement, as it implies both the time and amplitude measurement constraints, rather than the equivalent but less descriptive term "slicer" also used in the art. The well-known receiver "eye plot" graphically illustrates input signal values that will or will not provide accurate and reliable detected results from such measurement, and thus the allowable boundaries of the time- and amplitude-measurement windows imposed on the sampler.

Clock Data Recovery

So-called Clock Data Recovery or CDR circuits as in [Simpson] support such sampling measurements by extracting timing information, either from the data lines themselves or from dedicated clock signal inputs, and utilizing that extracted information to generate clock signals to control the time interval used by the data line sampling device(s). The actual clock extraction may be performed using well known circuits such as a Phase Locked Loop (PLL) or Delay Locked Loop (DLL), which in their operation may also generate higher frequency internal clocks, multiple clock phases, etc. in support of receiver operation.

As there may be unavoidable timing skews between signal lines and the recovered clock, it is common practice to incorporate secondary data line sampling circuits which may be intentionally offset by controlled amounts of time and/or amplitude, so as to determine the received data eye edges and thus discern whether the data sample timing or threshold level is optimally configured. One example of such art is given by [Loh]. Unfortunately, the addition of such secondary sampling circuits to multiple high-speed data inputs corresponds to a significant increase in integrated circuit real estate, and well as producing a substantial increase in power consumption.

Figure 6:
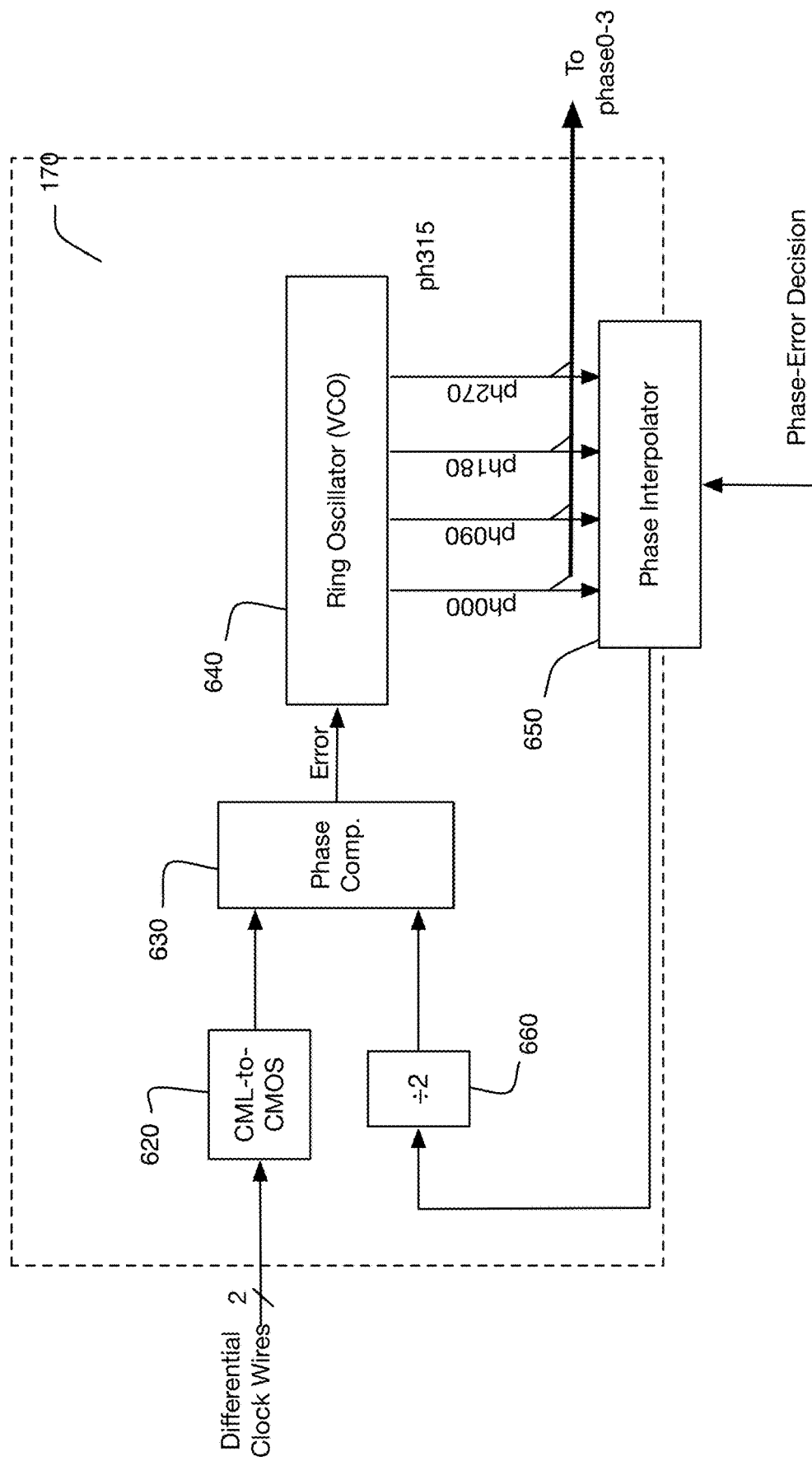
FIG. 6 is a block diagram of a receiver clock system, in accordance with some embodiments.

FIG. 6 illustrates an exemplary receiver clock system 170, which may be a modified version of the clock recovery system as described in [Simpson]. As shown, FIG. 6 includes a ring oscillator, which may be a voltage controlled oscillator (VCO), the ring oscillator configured to generate multiple phases of a sampling clock signal, one of which may be the sampling clock shown in FIG. 1. A phase interpolator 650 may receive the sampling clock phases from the VCO 640, and may generate an interpolated signal to provide to phase comparator 630. As shown, a frequency of the interpolated signal may be divided by some factor 660 prior to entering the phase comparator. The phase comparator may further receive a clock signal transmitted on the bus via differential clock wires, and generate an error signal to adjust the VCO 640. In the embodiment of FIG. 6, phase interpolator 650 may receive a phase-error decision signal corresponding to an early/late logic indication from one of the comparators 120 via the phase-error decision selection circuit 160, and may adjust an offset in the phase interpolator 650 based on the phase-error decision signal, which will in turn adjust a phase of the VCO 640 generating the sampling clocks.

Decision Feedback Equalization

It has become common practice for data communications receivers to incorporate Decision Feedback Equalization (DFE) to compensate for signal propagation anomalies in the communications medium. The DFE system performs time-domain oriented equalization on the received signal by maintaining a history of previously-received data values at the receiver, and processing those historic data values with a transmission line model to predict the expected influence each of the historical data values would have on the present receive signal. Such a transmission line model may be pre-calculated, derived by measurement, or generated heuristically, and may encompass the effects of one or more than one previous data interval. The predicted influence of these one or more previous data intervals is collectively called the DFE compensation, which is subsequently applied to the received signal to facilitate the current unit interval's detection. For purposes of explanation, this computation may be simply described as comprising multiplication of each previous unit interval's data value by a predetermined scaling factor, and then summation of each of these scaled results representing the effects of successive previous unit intervals to produce a composite DFE compensation value representing the cumulative predicted effect of all such previous unit intervals.

In a typical receiver design, this DFE compensation value will be subtracted from the current receive signal input, to produce a corrected signal more accurately representing the received data value. Such subtraction may be performed, as one example, by applying the received signal and the DFE compensation value to the inputs of a differential amplification circuit. In one common embodiment, this differential circuit represents the input of a digital comparator or a combined time- and amplitude-sampler, the output of which represents the detected data value relative to a particular threshold signal level.

Those familiar with the art will recognize that the DFE compensation value produced as described above cannot be calculated until the previous unit interval's data value has been detected. Thus, as data rates increase, a point will be reached at which the information to produce the DFE compensation value is not available in time to be applied to the next unit interval sampling. Indeed, at the highest data rates currently used in practice, this situation may exist for multiple previous unit intervals, as the detection time for a single data value may represent multiple unit interval durations, requiring the receiver to pipeline or parallelize the detection operation. Thus, it is common for embodiments to forgo such "closed loop" DFE methods for one or more of the most recent unit intervals, instead relying on an "open loop" or "unrolled loop" generation of one or more elements of the DFE compensation value for these most recent unit intervals.

In an effort to accelerate such DFE operation, some embodiments speculatively produce DFE compensation values corresponding to each of the possible detected data values for a given unit interval. In one example embodiment of this type, pairs of DFE compensation values are produced for three consecutive unit intervals corresponding to their possible binary data values, thus resulting in eight possible combined DFE compensation values for these three preceding unit intervals.

At least one embodiment extends this DFE unrolling behavior by incorporating multiple data detection samplers; each sampler provided with a distinct value of DFE compensation associated with the possible detected data value for one or more previous unit intervals. In such an embodiment, selection of which of the speculative DFE compensation values should be used may be postponed until after the current unit interval data detection, by storing the results of the various comparator outputs (which are dependent on different speculative DFE compensation values) and then later selecting which stored output is to be used for data detection. Although this late-decision DFE approach provides a significant increase in the amount of time available for data detection, it has an impact on receiver complexity. Moreover, the power utilization associated with the multiple samplers operating at high speeds may significantly increase receiver power use.

The set of DFE compensation values speculatively created to represent the constellation of potential detected data results over the previous transmit unit interval or intervals represent a set of measurement levels spanning some portion of the receive signal amplitude range. As an example, previous transmission of consecutive "zero" signals might lead to a predicted lower threshold level for a subsequent receiver data measurement incorporating speculative DFE compensation, while previous transmission of consecutive "one" signals might lead to a predicted higher threshold level for the same data measurement. Thus, for any data measurement used to detect an actual data value, the described multiple-sampler receiver will potentially perform measurement operations using thresholds either too high or too low for the actual signal during that interval. In some embodiments, these measurement operations from the samplers or comparators performing such speculative operations not directly associated with the actual data detection, although not used for determining the received data value, may nonetheless be used to obtain new information relating to clock recovery, thus mitigating the additional receiver power and complexity those devices add to the receiver.

Example Embodiment

For purposes of description and without implying limitation, a simple serial data receiver as shown in FIG. 1 will be used as an example. This example receiver includes at least one stage of speculative DFE 135 supported by two data samplers performing concurrent time-sampling operations at two different amplitude thresholds, and a receiver clock system 170 to produce a sampling clock, the phase of which may be adjusted by a CDR correction to optimize data sampling timing. As shown, the data samplers include comparators 120 generating comparator output slicing the signal received from CTLE 110 and sampling the comparator output according to the sampling clock.

In some embodiments, an apparatus includes two comparators 120 configured to generate two comparator outputs, the two comparators configured to compare a received signal to a first threshold and a second threshold according to a sampling clock, the first and second thresholds determined by an estimated amount of inter-symbol interference on a multi-wire bus. The apparatus may further include a data decision selection circuit 130 configured to select one of the two comparator outputs as a data decision, the selection based on at least one prior data decision that may be stored in data value history 140. The apparatus further includes a phase-error decision selection circuit 160 configured to select one of the two comparator outputs as a phase-error decision in response to receiving a CDR selection signal from a pattern detection circuit 150 configured to identify a predetermined data decision pattern in the data value history storage 140.

In some embodiments, the apparatus further includes a receiver clock system 170 configured to receive the phase-error decision and to responsively adjust a phase of the sampling clock. In some embodiments, the phase-error decision is an early/late logic decision on a transition of the received signal. In some embodiments, the data decision selection circuit 130 and phase-error decision circuit 160 select different comparator outputs.

In some embodiments, the apparatus further includes a decision-feedback equalization (DFE) circuit 135 configured to generate the first and second thresholds.

In some embodiments, the apparatus further includes a sub-channel detection multi-input comparator (MIC, not shown) operating on signals received via a plurality of wires, the sub-channel detection MIC configured to generate the received data input signal. In such embodiments, the signals received via the plurality of wires correspond to symbols of a codeword of a vector signaling code, the codeword corresponding to a weighted summation of a plurality of sub-channel vectors, each sub-channel vector mutually orthogonal. In such an embodiment, the inter-symbol interference is sub-channel specific, the sub-channel specific ISI corresponding to modulation of components of a corresponding sub-channel vector associated with the received signal. In some embodiments, sub-channel specific ISI associated with each sub-channel vector is mutually orthogonal. In some embodiments, the apparatus may further include a filter configured to filter the received signal prior to generating the comparator outputs.

Figure 2A:
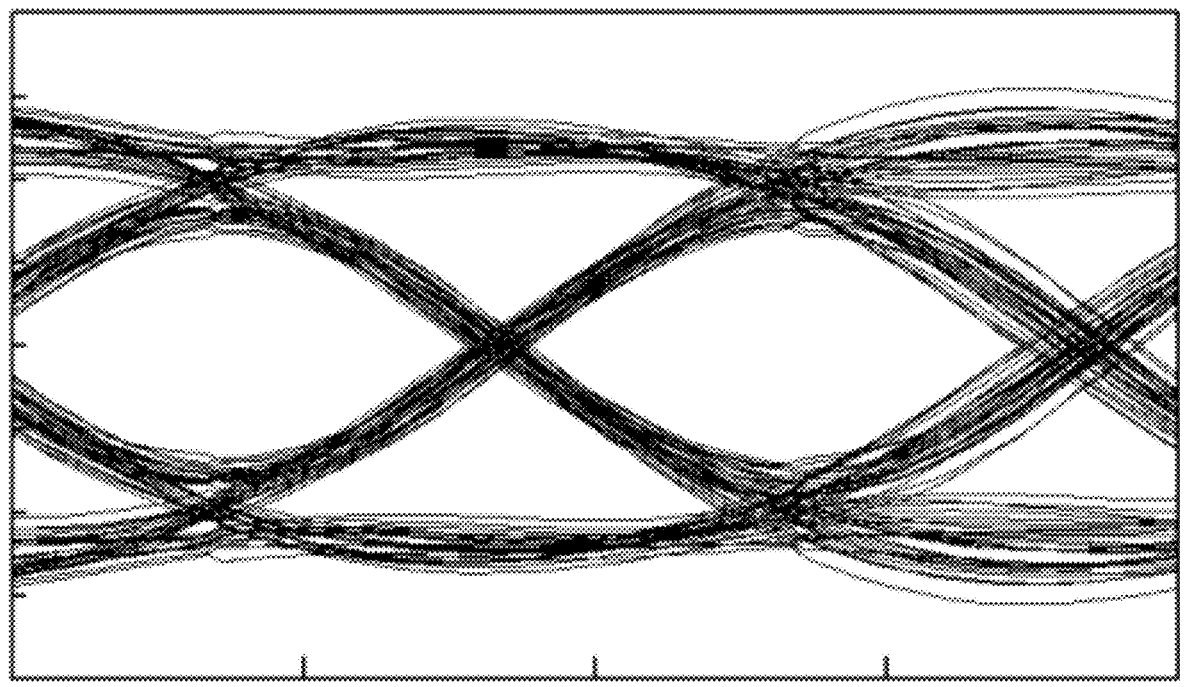
FIGS. 2A and 2B shows an example receive signal as an eye diagram.

FIG. 2A is an example of a typical receive signal "eye", produced by a time-overlay of the receive signal over multiple unit intervals. Thus, each individual line comprising the eye represents the receive signal "trajectory", as it passes from one unit interval to the next.

Figure 2B:
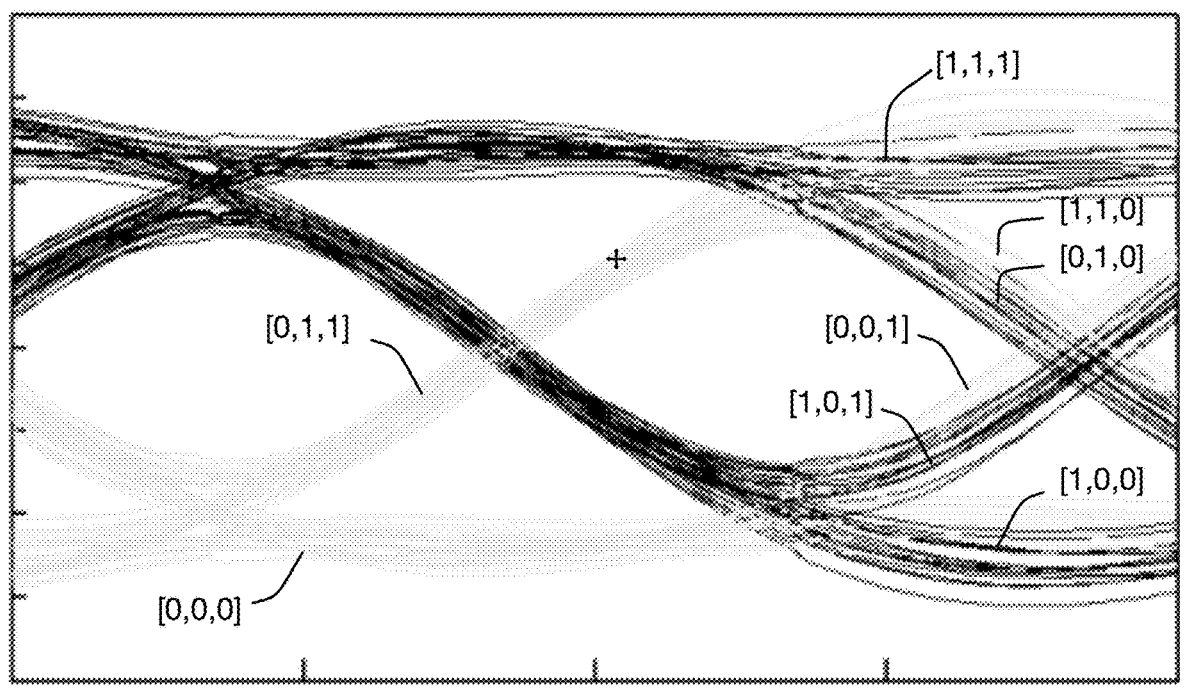

In FIG. 2B, subsets of signal trajectories comprising the eye of FIG. 2A are labeled using a triplet notation of [previous data value, current data value, subsequent data value]. As would be expected, the [1, 1, 1] trajectories are clustered along the top of the graph, the [1, 1, 0] trajectories transition downward at the right of the graph, [1, 0, 1] transition upward at the right of the graph, etc. Trajectories corresponding to a previous received data value of "1" (thus, optimally detected by the upper DFE sampling location) are shown as bold lines, while those trajectories corresponding to a previous received data value of "0" (and thus optimally detected by the lower DFE sampling location) are shown as pale lines.

The upper DFE sampler location selected by a DFE system to detect the current data value if the previous data value was "1" is shown with the symbol +. It may be noted that this sampler location is well positioned in the center of the upper data eye, but also is directly over the trajectory of a [0,1,1] and [0, 1, 0] received signal (the current data value of which will be detected by the lower sampler location, as determined by the previous data value of "0".) Thus, this + sampler result, unneeded for data detection of the [0,1,1] signal, may be utilized by the CDR system to determine whether the sampler timing is early or late relative to that signal transition.

In some embodiments, the signals shown in FIGS. 2A and 2B correspond to outputs of a sub-channel detection multi-input comparator (MIC) that is configured to receive a plurality of symbols of a codeword, and to detect modulations of a corresponding sub-channel vector of a plurality of sub-channel vectors, each sub-channel vector being mutually orthogonal. The codeword corresponds to a summation of the plurality of sub-channel vectors, and each sub-channel vector may be individually modulated by a corresponding information bit receive at an encoder generating the codeword. In such embodiments, the ISI seen in FIGS. 2A and 2B are sub-channel specific in that the ISI seen by the modulation of the corresponding sub-channel vector is only seen at the corresponding MIC. Thus, in a system with at least two sub-channel detection MICs, the ISI due to modulation of a first sub-channel vector is not felt at a second MIC for detecting a second sub-channel vector because the first and second sub-channel vectors are orthogonal.

Optimizing the Signal Waveform

Figure 3A:
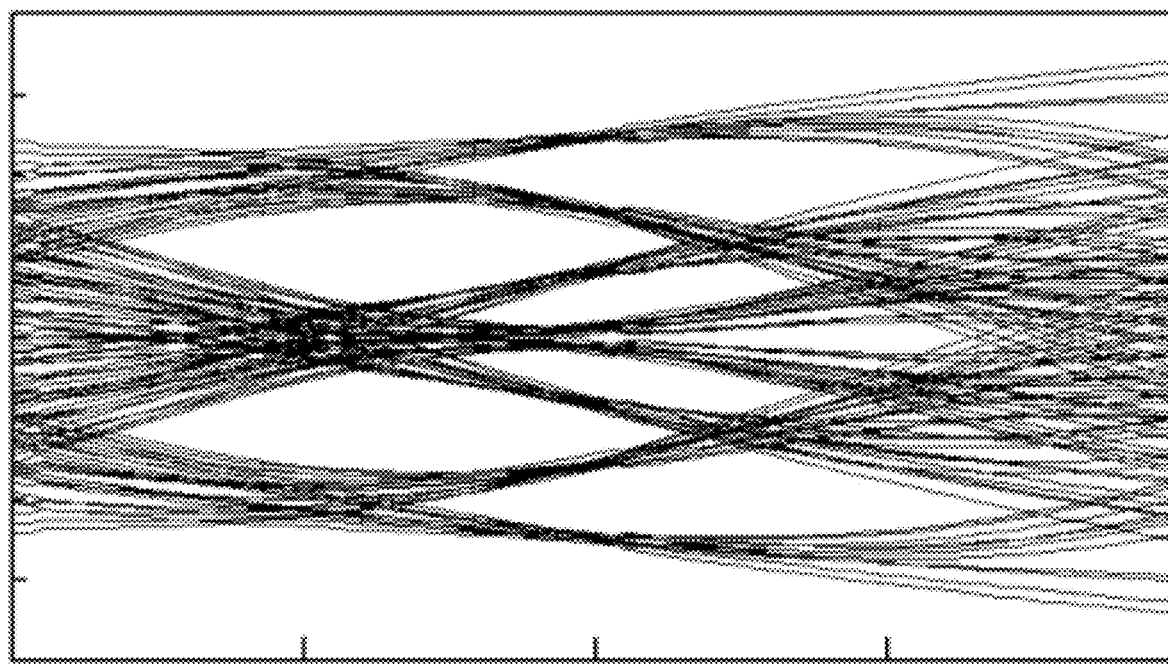
FIGS. 3A and 3B shows an example low pass filtered receive signal waveform as an eye diagram.
Figure 3B:
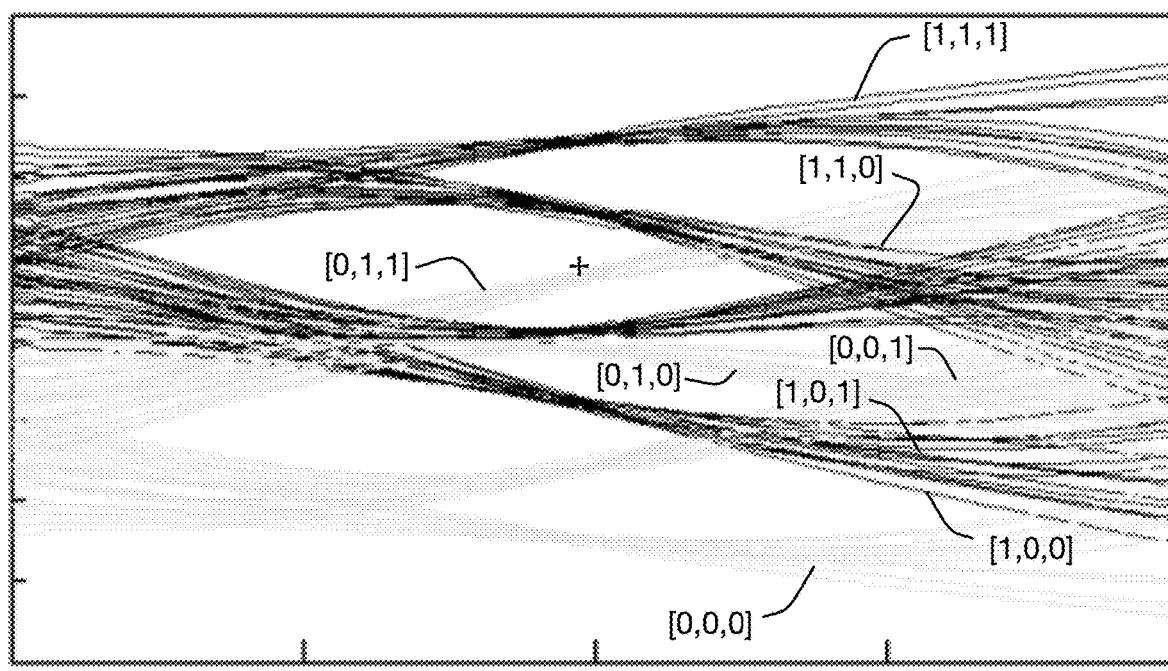

FIG. 3A shows the same signal eye as FIG. 2A but with additional low-pass filtering of the received data signal, in one example by appropriate configuration of a Continuous Time Linear Equalizer (CTLE) element in the signal path. In FIG. 3B, subsets of signal trajectories comprising the "eye" of FIG. 3A are labeled using the same triplet notation previously described, with trajectories corresponding to a current received data value of "1" are shown in bold lines, while those trajectories corresponding to a current received data value of "0" are shown as pale lines. The sampler location selected by a DFE system to detect the current data value if the previous data value was "1" is again shown with the symbol +.

It may be seen in FIG. 3B that such frequency-dependent filtration slightly reduces the vertical eye opening for data sampling, while significantly increasing the probability that the desirable [0, 1, 1] edge trajectories intersect the sampling point. Thus, rather than prior art CDR embodiments which introduce another sampling point at a time and amplitude measurement point chosen to intersect an edge, the present embodiment modifies the received signal using frequency-dependent filtering such that a resulting signal edge intersects an existing sampling point.

Figure 4:
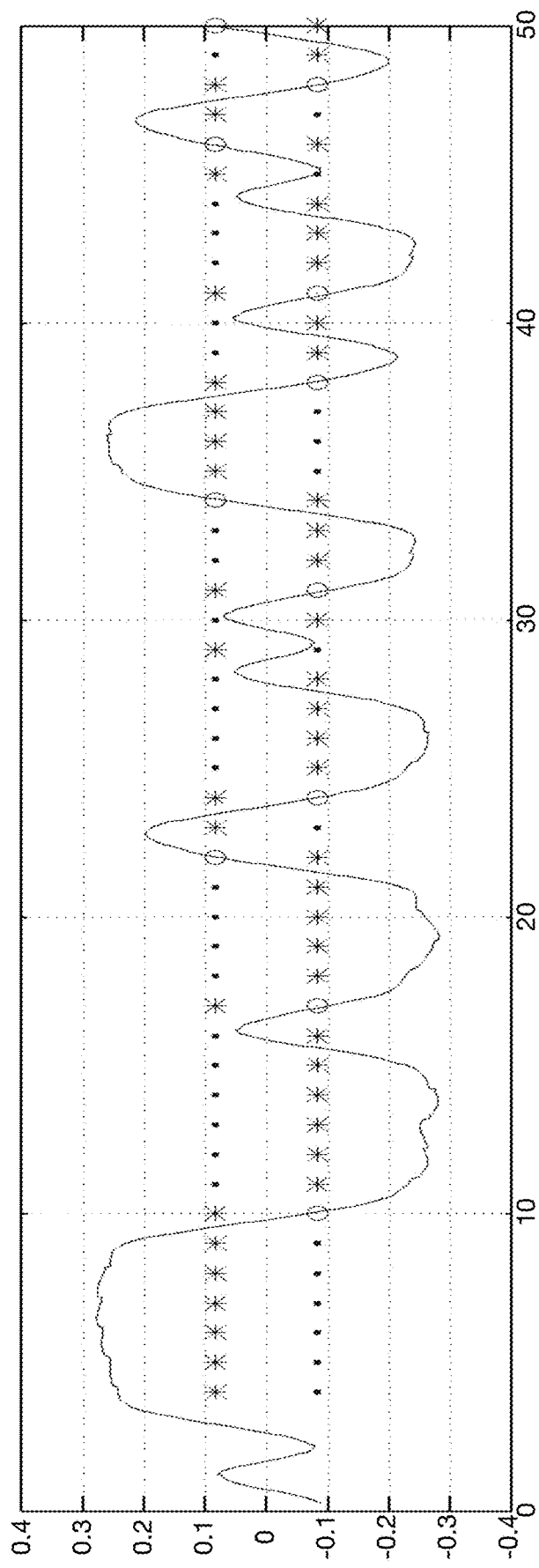
FIG. 4 is a graph of an example receive signal waveform annotated with representative sampling locations.

Continuing this example, FIG. 4 is a graph of a representative received signal waveform over 50 unit intervals, spanning an amplitude range from +0.28 to −0.28. Example thresholds as speculatively obtained from DFE are shown at +0.08 and −0.08, representing threshold values set for the two data samplers.

The useful data sampler results are graphically annotated using the symbols *, ○, and •, with * representing a data sampler result used to obtain a data value, and • representing an unneeded data sampler result which may be ignored (i.e. the DFE predicted compensation value not corresponding to the actual data value subsequently detected. It may easily be observed that in this example the DFE system may steer selection of the current unit interval's data sampler result based on the state of the previous unit interval data value, with the current unit interval's result obtained from the upper sampler if the previous unit interval data was "1", and from the lower sampler if the previous unit interval data was "0".

The sampler results illustrated by the symbol ○ represent the interesting case where the "unneeded" result is obtained at a signal amplitude and time during which the input signal is transitioning, i.e. a signal edge. The CDR system can use these results to determine whether the sampling clock it generates is early (thus, capturing the state of the input signal before its expected transition) or late (similarly, capturing the state of the input signal after its expected transition) and as a result make an appropriate clock phase adjustment.

Unlike known CDR systems such as [Loh I], the same samplers are used for data detection and clock edge detection. Also differing from known art, clock and data sampling are performed using the same sampler clock timing, rather than requiring use of an offset edge-sampling clock for edge detection and an eye-center clock for data detection.

Further examination of FIG. 4 shows that in this example the sampler results useful for CDR may be identified by the triplet of [last data, current data, next data] results, with the result triplet [1, 0, 0] indicating timing information from the low slicer, and [0, 1, 1] indicating timing information from the high slicer. Identification of such sequences is facilitated by the historical data values typically maintained in embodiments such as considered herein, both as input to the DFE computation, and as an inevitable artifact of the pipelined or parallelized receive process typically used at the high data rates under consideration.

Thus, returning to the example embodiment of FIG. 1, data samplers 120 capture the state of the received data input at a time determined by sampling clock generated by receiver clock system 170 and at different thresholds determined by DFE compensation values produced by DFE system 135 based on data value history 140. In some embodiments, an open-loop or unrolled DFE embodiment may produce predictive compensation values used to sample a received signal, and subsequently select 130 one sampled result to obtain a data value. The series of data values so obtained are stored in a data value history 140 for use in the described computations.

As previously described, the sampled result not selected to obtain a data value may under some conditions be used to observe a received data input transition. Pattern detection circuit 150 is triggered when those conditions are found in the sequence of data values stored in data value history 140, selecting a sampled data value using a phase-error decision selection circuit to be used as a CDR phase correction to receiver clock system 170. Shaping of the analog signal characteristics of the received data input being sampled maximizes the opportunities to utilize the sampled results for clock phase correction. The frequency-dependent filtering provided by CTLE 110 provides the necessary signal shaping in this example.

Figure 5:
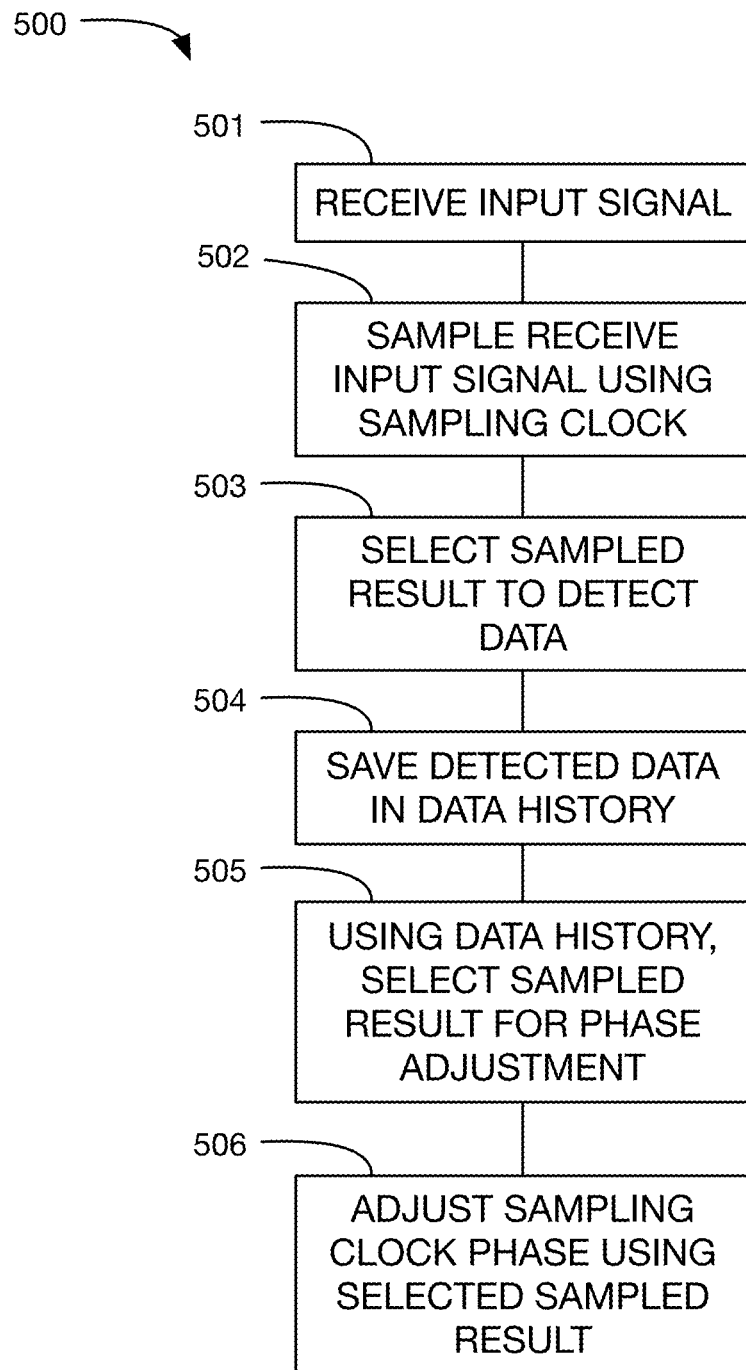
FIG. 5 is a flowchart of a method, in accordance with some embodiments.

FIG. 5 illustrates the operation of an embodiment as an operational sequence or process 500. One or more input signals are received 501 and are sampled 502 at two or more distinct amplitudes at a single time determined by the sampling clock. One such sampled result is selected 503 as the detected data value, which is then saved in a data history 504. Based on two or more saved data history values, a sampled result not selected as the detected data value is selected 505 and used to adjust the sampling clock phase 506 used for subsequent sampling. Similarly, the distinct amplitudes at which subsequent sampling is performed may be adjusted based on two or more saved data history values.

Figure 7:
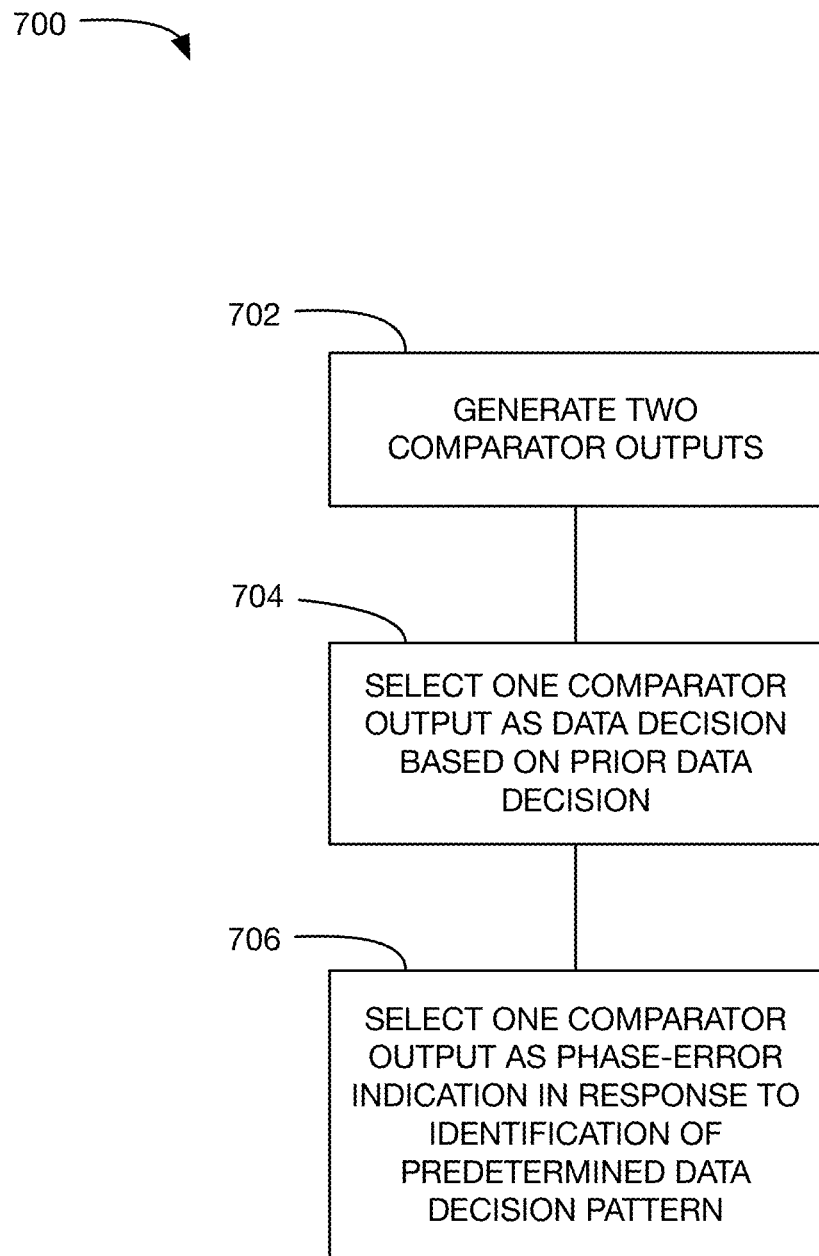
FIG. 7 is a flowchart of a method, in accordance with some embodiments.

FIG. 7 illustrates a flowchart of a method 700, in accordance with some embodiments. As shown, method 700 includes generating 702 two comparator outputs by comparing a received signal to a first threshold and a second threshold according to a sampling clock, the first and second thresholds determined by an estimated amount of inter-symbol interference on a multi-wire bus, selecting 704 one of the two comparator outputs as a data decision, the selection based on at least one prior data decision, and selecting 706 one of the two comparator outputs as a phase-error decision, the phase error decision selected in response to identification of a predetermined data decision pattern.

In some embodiments, the method further includes adjusting a phase of the sampling clock according to the phase-error decision. In some embodiments, the phase-error decision is an early/late logic decision on a transition of the received signal. In some embodiments, the data decision and phase-error decision correspond to different comparator outputs. In some embodiments, the method further includes generating the first and second thresholds using a decision-feedback equalization (DFE) circuit 135.

In some embodiments, the method further includes generating the received signal using a sub-channel detection multi-input comparator (MIC) operating on signals received via a plurality of wires. In some embodiments, the signals received via the plurality of wires correspond to symbols of a codeword of a vector signaling code, the codeword corresponding to a weighted summation of a plurality of sub-channel vectors, each sub-channel vector mutually orthogonal. In some embodiments, the inter-symbol interference is sub-channel specific, the sub-channel specific ISI corresponding to modulation of components of a corresponding sub-channel vector associated with the received signal. In some embodiments, sub-channel specific ISI associated with each sub-channel vector is mutually orthogonal. In some embodiments, the method further includes filtering the received signal prior to generating the comparator outputs.

As described in [Shokrollahi], an exemplary encoding scheme for above-described codewords is given below:

Each codeword may be generated by multiplying a row vector of information bits S by an orthogonal matrix A:

$$S \cdot A = w$$

$$\text{where } A = \begin{bmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{bmatrix}$$

and S=a row vector of information bits [0, $S_0$, $S_1$, $S_2$, $S_3$, $S_4$] representing antipodal weights (e.g., ±1 for logic bits 0, 1, or alternatively ±⅓), and w is the codeword vector of symbols to be transmitted [$w_0$, $w_1$, $w_2$, $w_3$, $w_4$, $w_5$]. As shown, each row in matrix A corresponds to a sub-channel vector, and each sub-channel vector is (i) mutually orthogonal and (ii) orthogonal to the common-mode row of all ones. In such embodiments, the common-mode row of all 1's may be unused, and rows 2-6 are each modulated by a corresponding information bit $S_0$-$S_4$ to transmit 5 bits over 6 wires.

A third embodiment of a signaling design also utilizes linear coding and is called Ensemble-NRZ or ENRZ. ENRZ has 8 codewords of the form ±perm (1, −⅓, −⅓, −⅓) where "perm" means all the permutations of the coefficients, and 3 MICs of the form (½, −½, ½, −½), (½, ½, −½, −½) and (½, −½, −½, ½), and can send 3 bits over 4 wires per unit interval. The coding matrix is a scaled version of the 4×4-Hadamard matrix:

$$A = \frac{1}{3}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The scale factor ⅓ is chosen so that the final values are constrained to be between −1 and 1. The throughput is 6 Gbps/wire.

DFE embodiments are known that perform more complex analysis based on a larger history of previous data values to determine the correct sampler result, so such embodiments may similarly utilize more complex historical data value sequences when selecting sampler results useful for CDR adjustment, thus no limitation should be inferred from the simplified descriptive examples herein. Similarly, embodiments incorporating differently configured signal filtration (i.e. producing as a result different delay relationships for different signal trajectories and sampling point locations) may utilize different historical data value sequences when selecting such desirable sampler results. It may also be noted that the naming of the data value triplets as [last data, current data, next data] is arbitrary and chosen for descriptive simplicity, with no limitation implied; in an embodiment which maintains a historical record of received data values as described herein, such a sequence may be equally well comprised of any set of sequential historical values, such as [historically penultimate data value, historically last data value, current data value], etc. Indeed, in at least one embodiment, the sequence of data values used in sampler selection, the stored sampler value selected for data detection, and the stored sampler value selected as relevant to updating of the CDR phase, all represent receive unit intervals previous to the present time.

We claim:

1. A method comprising:
   receiving a data signal over a series of signaling intervals that forms a signaling eye for a data pattern of a plurality of data patterns, the plurality of data patterns comprising transitioning data patterns;
   filtering the data signal to align transitioning signal edge trajectories of each transitioning data pattern with a corresponding one of a plurality of speculative decision feedback equalization (DFE) decision thresholds;
   generating, for each speculative DFE decision threshold, a corresponding sample of the data signal using a respective sampler according to a sampling clock, wherein the corresponding sample for a given DFE decision threshold corresponds to (i) a data decision for a first subset of the plurality of data patterns, (ii) an edge sample for a second subset of the plurality of data patterns, and (iii) neither a data decision nor an edge sample for a third subset of the plurality of data patterns;

generating phase-error signals based on each edge sample; and providing the phase-error signals to a clock recovery circuit to adjust the sampling instant of the sampling clock.

2. The method of claim 1, further comprising generating the data signal by combining signals received via a plurality of wires of a multi-wire bus, the combining performed according to a sub-channel vector of a plurality of mutually-orthogonal sub-channel vectors.

3. The method of claim 1, wherein the phase-error signal is an early/late logic decision, and wherein the early/late logic decision is used to update a voltage controlled oscillator in the clock recovery circuit.

4. The method of claim 1, wherein each data pattern of the plurality of data patterns spans three signaling intervals.

5. The method of claim 1, wherein the first, second, and third subsets of the plurality of data patterns are mutually exclusive.

6. An apparatus comprising:
a continuous time linear equalizer (CTLE) configured to receive a data signal comprising a plurality of data patterns over a series of signaling intervals and to filter the data signal to generate a filtered data signal having altered signal trajectories;
a voltage comparator configured to generate a sample of the filtered data signal responsive to a sampling clock and according to a decision threshold associated with a decision feedback equalizer coefficient;
a data pattern detection circuit configured to identify a specific data pattern associated with the sample; and
a selection circuit configured to responsively process the sample as (i) a valid data decision, (ii) a phase error sample to provide to a clock recovery circuit for adjusting the sampling clock, or (iii) an unneeded sample which may be ignored.

7. The apparatus of claim 6, further comprising a multi-input comparator (MIC) configured to generate the data signal by combining signals received via a plurality of wires of a multi-wire bus, the combining performed according to a sub-channel vector of a plurality of mutually-orthogonal sub-channel vectors.

8. The apparatus of claim 7, wherein the plurality of mutually-orthogonal sub-channel vectors are selected from a Hadamard matrix of size 4, and wherein the signals are received in parallel over four wires of the multi-wire bus.

9. The apparatus of claim 6, wherein the clock recovery circuit comprises logic configured to receive each edge sample and a corresponding previous data decision, to generate an early/late logic decision, and wherein the early/late logic decision is used to update a voltage controlled oscillator in the clock recovery circuit.

10. The apparatus of claim 6, wherein the selection circuit is configured to process the sample as the valid data decision based on a historical data decision determined in a previous signaling interval.

11. The apparatus of claim 6, wherein the selection circuit is configured to process the sample as the phase error sample responsive to the data pattern detection circuit detecting a transitioning data pattern.

12. The apparatus of claim 6, wherein the selection circuit is configured to process the sample as the unneeded sample which may be ignored responsive to the data pattern detection circuit detecting a non-transitioning pattern and further based on a historical data decision determined in a previous signaling interval.

13. A method comprising:
receiving a data signal comprising a plurality of data patterns over a series of signaling intervals and filtering the data signal to generate a filtered data signal having altered signal trajectories;
generating a sample of the filtered data signal responsive to a sampling clock and according to a decision threshold associated with a decision feedback equalizer coefficient;
identifying a specific data pattern associated with the sample; and
processing the sample as (i) a valid data decision, (ii) a phase error sample to provide to a clock recovery circuit for adjusting the sampling clock, or (iii) an unneeded sample which may be ignored.

14. The method of claim 13, further comprising receiving signals via a plurality of wires of a multi-wire bus, and generating the data signal by combining the signals according to a sub-channel vector of a plurality of mutually-orthogonal sub-channel vectors.

15. The method of claim 14, wherein the plurality of mutually-orthogonal sub-channel vectors are selected from a Hadamard matrix of size 4, and wherein the signals are received in parallel over four wires of the multi-wire bus.

16. The method of claim 13, wherein processing the sample as the phase error sample to provide to a clock recovery circuit for adjusting the sampling clock comprises generating an early/late logic decision based on the phase error sample and a historical data decision.

17. The method of claim 13, the sample is processed as the valid data decision based on a historical data decision determined in a previous signaling interval.

18. The method of claim 13, wherein the sample is processed as the phase error sample responsive to the data pattern detection circuit detecting a transitioning data pattern.

19. The method of claim 18, wherein the transitioning data pattern is a triplet data pattern.

20. The method of claim 13, wherein the sample is processed as the unneeded sample which may be ignored responsive to detecting a non-transitioning pattern and further based on a historical data decision determined in a previous signaling interval.

* * * * *